United States Patent [19]

Sasaki

[11] Patent Number: 4,864,523
[45] Date of Patent: Sep. 5, 1989

[54] PORTABLE APPARATUS HAVING A CABLE GUIDE DUCT MOUNTED BETWEEN A BASE HOUSING AND A DISPLAY AND PIVOTALLY CONNECTED TO THE BASE HOUSING

[75] Inventor: Katumaru Sasaki, Ohme, Japan

[73] Assignee: Kabushiki Kaisha Toshiba, Kanagawa, Japan

[21] Appl. No.: 92,127

[22] Filed: Sep. 2, 1987

[30] Foreign Application Priority Data

Sep. 4, 1986 [JP] Japan .............................. 61-135873

[51] Int. Cl.⁴ .............................................. G06F 1/00
[52] U.S. Cl. .................................................. 364/708
[58] Field of Search .............................. 364/708–710; 340/711

[56] References Cited

U.S. PATENT DOCUMENTS

| | | | |
|---|---|---|---|
| 4,496,943 | 1/1985 | Greenblatt | 340/711 |
| 4,497,036 | 1/1985 | Dunn | 364/708 |
| 4,571,456 | 2/1986 | Paulsen et al. | 340/700 X |
| 4,739,316 | 4/1988 | Yamaguchi et al. | 340/711 |
| 4,742,478 | 5/1988 | Nigro, Jr. et al. | 364/708 |

FOREIGN PATENT DOCUMENTS

| | | | |
|---|---|---|---|
| 60-160418 | 8/1985 | Japan | 364/708 |
| 60-214030 | 10/1985 | Japan | 364/708 |
| 60-225919 | 11/1985 | Japan | 364/708 |
| 60-225920 | 11/1985 | Japan | 364/708 |
| 61-7971 | 1/1986 | Japan | 364/708 |

*Primary Examiner*—Gary V. Harkcom
*Assistant Examiner*—Tan V. Mai
*Attorney, Agent, or Firm*—Finnegan, Henderson, Farabow, Garrett, & Dunner

[57] ABSTRACT

Laptop computer apparatus includes a base housing, a display housing, a cable and a cable guide duct. The base includes a front upper surface having a keyboard. The display portable apparatus and a closed position for covering the keyboard. The cable is introduced from the base housing into the display housing through the cable guide duct. The cable guide duct includes a first surface and a second surface. When the display housing is rotated to the open position, the first surface is exposed. When the display housing is rotated to the closed position, the second surface is exposed.

12 Claims, 3 Drawing Sheets

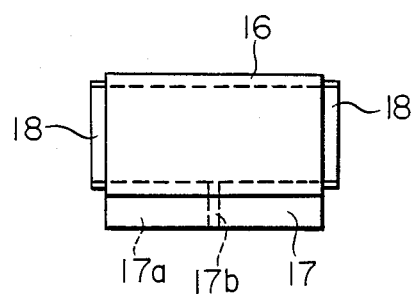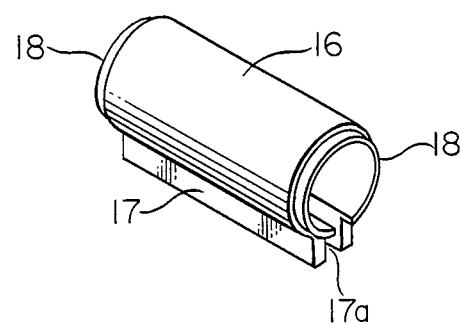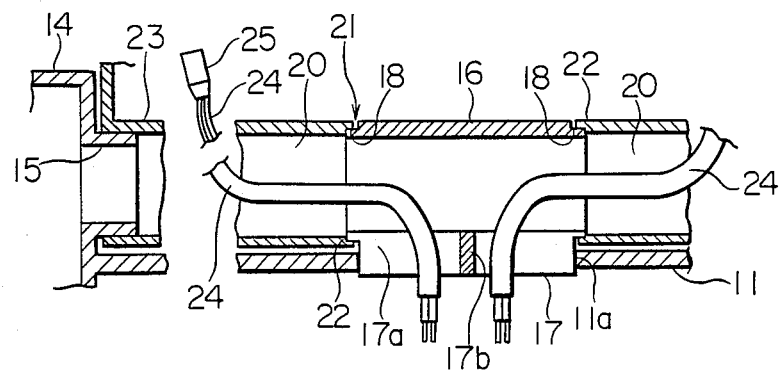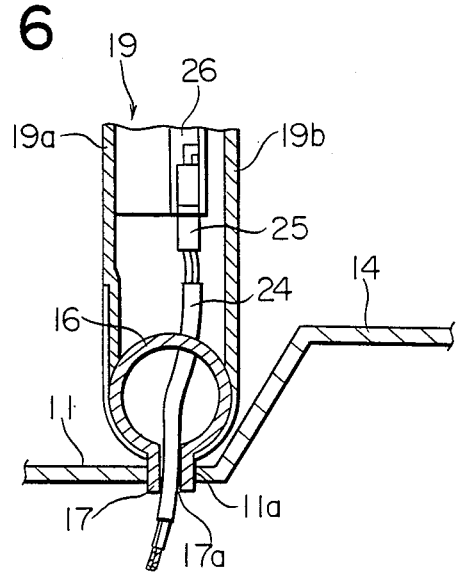

PORTABLE APPARATUS HAVING A CABLE GUIDE DUCT MOUNTED BETWEEN A BASE HOUSING AND A DISPLAY AND PIVOTALLY CONNECTED TO THE BASE HOUSING

The present application claims priority of Japanese Utility Model Application No. 61-135873 filed on Sept. 4, 1986.

FIELD OF THE INVENTION AND RELATED ART STATEMENT

The present invention relates to a portable hand-held type data processing apparatus such as a portable hand-held computer, a word processor or the like.

Recently, various kinds of data processors such as hand-held type computers and word processors have been developed.

Such conventional portable data processors have a body housing incorporating a data processing means and a memory means, and a key-board laid on the upper surface of the body housing. Further, display attaching sections are provided at both sides of the body housing, each having a ring-like projection. These projections are engaged with engaging parts of a hollow shaft section formed in a display device, and therefore, the display device is rotatable within a predetermined range. Further, the display device can be closed downward to cover the key-board, and can be tilted to stand up on the body housing.

Further, the body housing and the display device are connected through cables and plugs attached to ends of the cables which are guided through the hollow shafts of the display device from the display attaching sections of the body housing.

However, the thus arranged conventional data processors have the disadvantage that the connection between the body housing and the display device is complicated and difficult, since the cable and the plugs attached at ends of the cables have to be inserted through the engaging parts of the display attaching sections of the body housing and then inserted through the hollow shaft sections of the display device. Further, there is also a disadvantage that it is difficult to miniaturize the data processor since the inner diameters of the engaging parts and the hollow shaft section have to be determined in accordance with the outer diameters of the cables and the plugs. In addition, there is another disadvantage that the overall length of the cables is great, since connection between the body housing and the display device is made by inserting the cables into the hollow shaft sections of the display device at both sides of the body housing, resulting in occurrence of electric wave troubles or the like.

OBJECT AND SUMMARY OF THE INVENTION

Accordingly, one object of the present invention is to provide a data processing apparatus which can facilitate the work of cable insertion and which effectively miniaturizes the apparatus itself.

Another object of the present invention is to provide a data processing apparatus in which the overall length of the cables can be greatly reduced, and therefore it is possible to reduce the cost of the data processing apparatus.

According to the present invention, there is provided a portable apparatus comprising a base housing including a rear end wall, a front upper surface having a key-board, a display attaching section mounted between the rear end wall and the keyboard and including a plurality of first hinge sections and a first duct connecting section mounted between each of the first hinge sections; a display housing including a flat panel display, a plurality of second hinge sections each pivotally connected to each of the first hinge sections, respectively, and a second duct connecting section mounted between the second hinge sections; the display housing being rotatable between an open position for operating the portable apparatus and a closed position for covering the keyboard; a cable guide duct for guiding a cable, the cable guide duct including a base housing connecting section connected to the first duct connecting section for guiding the cable from the base housing into the cable guide duct, a display housing connecting section connected to the second duct connecting section for guiding the cable from the cable guide duct into the display housing, a first surface for covering the cable in the open position and a second surface for covering the cable in the closed position.

Further, with the above-mentioned arrangement of the present invention, it is possible to effectively facilitate the work of insertion of cables and miniaturize the apparatus while the length of each cable can be shortened.

BRIEF DESCRIPTION OF THE DRAWINGS

FIG. 3 is a perspective view illustrating a cable guide duct shown in FIG. 1;

FIG. 4 is a plan view of FIG. 3;

FIG. 5 is a plan view illustrating the important part of FIG. 1 in cross-section;

FIG. 6 is a side view of FIG. 5;

DETAILED DESCRIPTION OF PREFERRED EMBODIMENT

Figure 1:
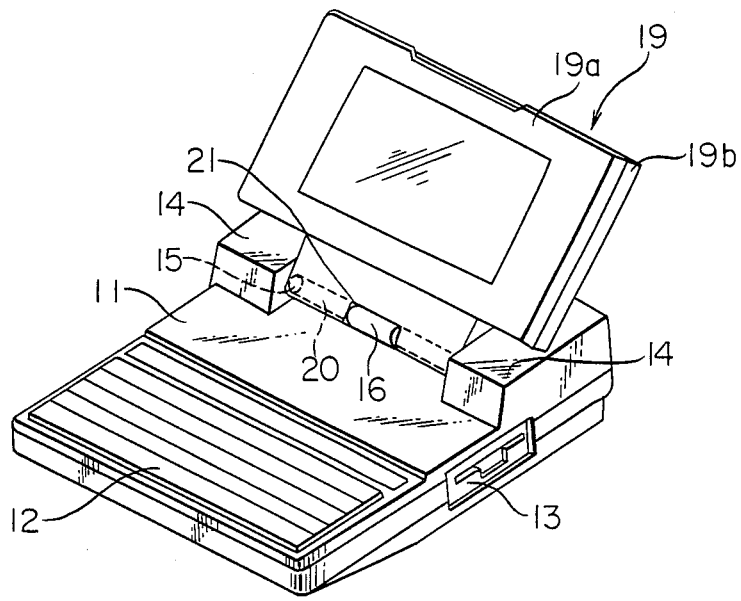
FIG. 1 is a perspective view illustrating a data processing apparatus in one embodiment of the present invention, where the display device thereof is open.
Figure 2:
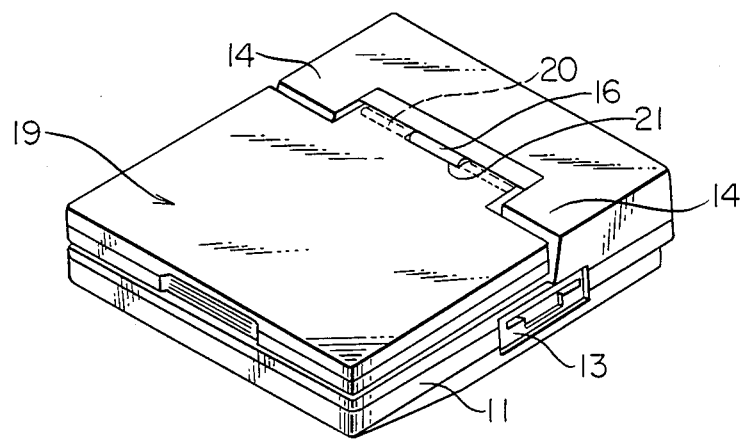
FIG. 2 is a perspective view illustrating the data processing apparatus shown in FIG. 1, with the display device being closed.
Figure 7:
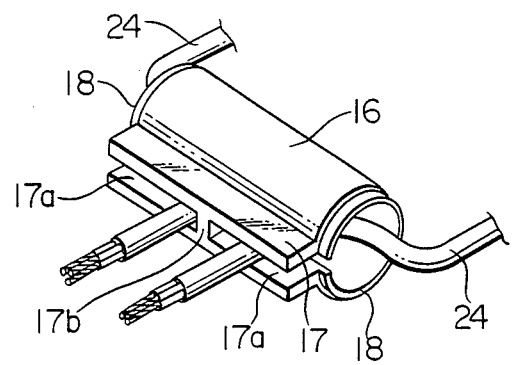
FIG. 7 is a perspective view illustrating cables which are inserted into the cable guide duct as shown in FIG. 6.

One embodiment of the present invention will be described in detail with reference to the drawings.

Referring to the drawings, a base housing 11 incorporating data processing means and memory means which are not shown, has a key-board 12 arranged thereon. Further, a floppy disk drive unit 13 is integrally incorporated in one side surface of the base housing 11.

A pair of display device attaching sections 14 is provided on the base housing 11 with a predetermined space therebetween, and each section 14 is formed therein with engaging parts 15, respectively. Further, a cable guide duct 16 is disposed between these display device attaching sections. This cable guide duct 16 is formed with a slit section 17a and as attaching piece 17 having a reinforcing rib 17b an shown in FIGS. 3 and 4. The attaching piece 17 is inserted in an attaching hole 11a formed in the base housing 11 and is fixed to the latter as shown in FIG. 5. Further, the cable duct guide 16 is also formed with engaging parts 18 similar to the engaging part 15 of each display device attaching section 14.

Further, a display device 19, formed in a planer shape so as to be divided into a front plate 19a and a back plate 19b which are separable from each other, is formed with a hollow shaft section 20. This hollow shaft section 20 is formed in its intermediate section with a cut-out opening part 21 which is in turn formed with a pair of engaging parts 22, which are adapted to be engaged with the engaging parts 18 of the cable guide duct 16. Further, the hollow shaft section 20 is also formed at both its ends with a pair of engaging parts 23 which are adapted to be engaged with the pair of engaging parts 15 of the base housing 11. Accordingly, the display device 19 is pivotably arranged on the base housing 11 so that it can be closed to cover the key-board 12 while it can be tilted to stand up on the base housing 11.

Each cable 24 has a plug 25 connected to one end thereof for connecting between the base housing 11 and the display device 19. These cables 24 are introduced from the base housing 11 into the hollow shaft section 20 of the display device 19 through the slit section 17a of the cable guide duct 16, and the plugs 25 are connected to associated jacks 26 in the display device 19.

Accordingly, in this embodiment, when the cables 24 are connected, they are introduced from the base housing 11 through the slit section 17a of the cable duct guide 16, which therefor clamps them, and then the cable duct guide 16 is fixed to the base housing 11. Further, the plugs 25 of the cables 24 are connected to the jacks 26 in the display device 19, and the hollow shaft section 20 is engaged with the engaging parts 18 of the cable duct guide 16. The display device 19 is divided into the front plate 19a and the back plate 19b which are then assembled. Thereby the display device can be rotatably arranged in the base housing 11.

Accordingly, in this embodiment, the cables 24 can be laid linearly from the base housing 11 to the display device 19 through the cable guide duct 16 so that the overall length of the cables 24 can be shortened greatly in comparison with a conventional cable. Also, the work of connection and insertion of the cables 24 can be facilitated since only a single step of clamping the cables by the slit section 17a is carried out. Further, the inner diameter of the hollow shaft section 20 can be selected taking into consideration only the outer diameter of the cables 24, and therefore, it is possible to miniaturize the apparatus.

Figure 8:
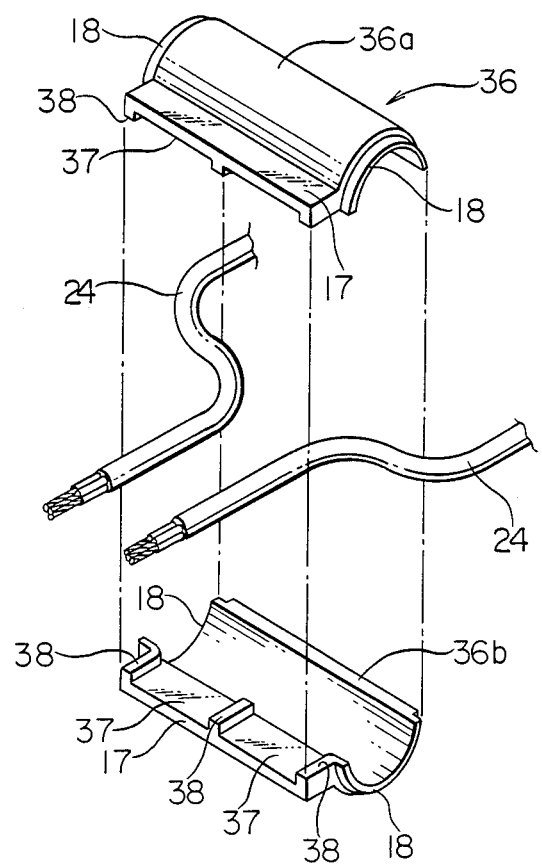
FIG. 8 is an exploded perspective view illustrating a cable guide duct and cables inserted therein, and adapted to be used in a data processing apparatus in another embodiment of the present invention.

FIG. 8 shows an exploded perspective view illustrating an important section of a data processing apparatus in another embodiment of the present invention, in which parts common to those shown in FIGS. 1 to 7 are shown with like reference numerals in order to eliminate the repetition of explanation therefor.

In the embodiment shown in FIG. 8, a cable guide duct 36 is split in the longitudinal direction into two pieces consisting of split duct halves 36a, 36b having attaching pieces 17 each formed therein with recess grooves 37 and reinforcing ribs 38, respectively. Further, the cables 24 are clamped between the recess grooves 37.

Accordingly, even in this embodiment, advantages similar to those obtained in the above-mentioned embodiment shown in FIGS. 1 through 7, can be obtained.

As mentioned above, in the data processing apparatus according to the present invention, it is possible to shorten the overall length of the cables, and to facilitate the work of insertion of the cable. Further it is possible to effectively miniaturize the apparatus.

What is claimed is:

1. A portable apparatus comprising:
    a base housing including a rear end wall, a front upper surface having a keyboard, a display attaching section mounted between the rear end wall and the keyboard and including a plurality of first hinge sections and a first duct connecting section mounted between each of the first hinge sections;
    a display housing including a flat panel display, a plurality of second hinge sections pivotally connected to each of the first hinge sections, respectively, and a second duct connecting section mounted between the second hinge sections, the display housing being rotatable between an open position for operating the portable apparatus and a closed position for covering the keyboard; and
    a cable guide duct for guiding a cable, the cable guide duct including a base housing connecting section connected to the first duct connecting section for guiding the cable from the base housing into the cable guide duct, a display housing connecting section connected to the second duct connecting section, respectively, for guiding the cable from the cable guide duct into the display housing, a first surface for covering the cable in the open position and a second surface for covering the cable in the closed position.

2. The portable apparatus according to claim 1 wherein the cable guide duct is mounted between the second hinge sections.

3. The portable apparatus according to claim 2 wherein the cable guide duct further comprises a duct section including the first surface and the second surface.

4. The portable apparatus according to claim 3 wherein the cable guide duct further comprises an attaching piece engaging the first duct connecting section and the duct section further comprises a first end portion and a second end portion, each of the first and second end portions being pivotally connected to the second duct connecting section.

5. A portable apparatus according to claim 4 wherein the display housing further comprises a plurality of hollow shaft section for guiding the cable from the cable guide duct into the display housing, each of the hollow shaft sections having a first end portion pivotally connected to one of the first hinge sections, respectively, and a second end portion pivotally connected to the display housing connecting section.

6. A portable apparatus according to claim 5 wherein the display housing further comprises a duct mounting section for mounting the cable guide duct between the second hinge sections, the duct mounting section including the second duct connecting section.

7. A portable apparatus according to claim 6 wherein the base housing further comprises an attaching hole engaging the duct mounting section.

8. A portable apparatus according to claim 7 wherein the attaching piece further comprises a slit section for stopping the cable in the attaching piece.

9. A portable apparatus according to claim 8 wherein the cable guide duct further comprises a first semi-cylindrical member and a second semi-cylindrical member.

10. A portable apparatus according to claim 8 wherein the display housing has a front plate and back plate.

11. A portable apparatus comprising:
a base housing including a rear end wall, a front upper surface having a keyboard, a display attaching section mounted between the rear end wall and the keyboard and including a plurality of first hinge sections and a first duct connecting section mounted between each of the first hinge sections;
a display housing including a flat panel display, a plurality of second hinge sections pivotally connected to each of the first hinge sections, respectively, and a duct mounting section mounted between each of the second hinge sections and engaging the first duct connecting section, the duct mounting section including second duct connecting section, the display housing being rotatable between an open position for operating the apparatus and a closed position for covering the keyboard; and
a cable guide duct for guiding a cable, the cable guide duct including a base housing connecting section connected to the first duct connecting section for guiding the cable from the base into the cable duct, a display housing connecting section connected to the second duct connecting section for guiding the cable from the cable guide duct into the display housing, a first surface for covering the cable in the open position and a second surface for covering on the cable in the closed position.

12. A portable apparatus according to claim 11 wherein the cable guide duct further comprises a duct section including a first end portion and second end portion, each of the first and second end portions being pivotally connected to the second duct connecting section and wherein the cable duct guide further includes an attaching piece engaging the first duct connecting section.

* * * * *

UNITED STATES PATENT AND TRADEMARK OFFICE
CERTIFICATE OF CORRECTION

PATENT NO. : 4,864,523

DATED : September 5, 1989

INVENTOR(S) : Katumaru Sasaki

It is certified that error appears in the above-identified patent and that said Letters Patent is hereby corrected as shown below:

ON THE TITLE PAGE

In the Abstract, line 4, "display" should be followed by --housing is rotable between an open position for operating the--.

Signed and Sealed this

Thirtieth Day of June, 1992

*Attest:*

DOUGLAS B. COMER

*Attesting Officer*  *Acting Commissioner of Patents and Trademarks*